United States Patent [19]
Collins et al.

[11] Patent Number: 5,652,020
[45] Date of Patent: Jul. 29, 1997

[54] HYDROGEN-SELECTIVE MEMBRANE

[75] Inventors: John P. Collins; J. Douglas Way, both of Boulder, Colo.

[73] Assignee: The State of Oregon Acting By and Through the State Board of Higher Education on Behalf of Oregon State University, Corvallis, Oreg.

[21] Appl. No.: 593,013

[22] Filed: Jan. 29, 1996

Related U.S. Application Data

[63] Continuation of Ser. No. 383,910, Feb. 6, 1995, abandoned, which is a continuation of Ser. No. 64,513, May 19, 1993, Pat. No. 5,451,386.

[51] Int. Cl.$^6$ .................................. B05D 5/00; B05D 7/22
[52] U.S. Cl. ................... 427/230; 260/500.25; 427/244; 427/304
[58] Field of Search .................... 210/500.25; 427/125, 427/244, 304, 230; 95/96; 96/8, 10; 423/237, 351, 658.2

[56] References Cited

U.S. PATENT DOCUMENTS

| | | |
|---|---|---|
| 1,174,631 | 3/1916 | Snelling . |
| 3,251,173 | 5/1966 | Ehlers et al. . |
| 3,368,329 | 2/1968 | Eguchi et al. . |
| 3,545,931 | 12/1970 | McKinley . |
| 3,713,270 | 1/1973 | Farr et al. . |
| 4,483,694 | 11/1984 | Takamura et al. ............... 417/126.4 X |
| 4,865,630 | 9/1989 | Abe . |

FOREIGN PATENT DOCUMENTS 0 228 885 A2   12/1986   European Pat. Off. .

OTHER PUBLICATIONS

Buxbaum, "Hydrogen Extraction via Non-porous Coated–Metal Membranes," abstract presented at AIChE annual meeting, Miami Beach, Florida (Nov. 1992).

Govind, et al., "Surface Modification of Ceramic Membranes for Selective Separation of Gases at High Temperature," Abstract presented at the Fifth Annual Meeting of the North American Membrane Society, Lexington, Kentucky (May 1992).

Uemiya, et al., "Palladium/Porous–Glass Composite Member for Hydrogen Separation," *Chemistry Letters* 1687–1690 (1988).

*Primary Examiner*—Michael Lusignan
*Attorney, Agent, or Firm*—Klarquist Sparkman Campbell Leigh & Whinston

[57] ABSTRACT

A hydrogen-selective membrane comprises a tubular porous ceramic support having a palladium metal layer deposited on an inside surface of the ceramic support. The thickness of the palladium layer is greater than about 10 μm but typically less than about 20 μm. The hydrogen permeation rate of the membrane is greater than about 1.0 moles/m$^2$. s at a temperature of greater than about 500° C. and a transmembrane pressure difference of about 1,500 kPa. Moreover, the hydrogen-to-nitrogen selectivity is greater than about 600 at a temperature of greater than about 500° C. and a transmembrane pressure of about 700 kPa. Hydrogen can be separated from a mixture of gases using the membrane. The method may include the step of heating the mixture of gases to a temperature of greater than about 400° C. and less than about 1000° C. before the step of flowing the mixture of gases past the membrane. The mixture of gases may include ammonia. The ammonia typically is decomposed to provide nitrogen and hydrogen using a catalyst such as nickel. The catalyst may be placed inside the tubular ceramic support. The mixture of gases may be supplied by an industrial process such as the mixture of exhaust gases from the IGCC process.

5 Claims, 7 Drawing Sheets

HYDROGEN-SELECTIVE MEMBRANE

This is a continuation, of application Ser. No. 08/383, 910, filed Feb. 6, 1995, abandoned, which is a continuation of application Ser. No. 08/064,513, filed May 19, 1993, now U.S. Pat. No. 5,451,386.

GOVERNMENTAL SUPPORT

This invention was made in part with governmental support provided by the United States Department of Energy under contract number DE-AC21-89MC26373. The United States government may have certain rights in this invention.

FIELD OF THE INVENTION

This invention concerns a palladium-ceramic me an a method for selectively separating hydrogen from a mixture of gases using the membrane, particularly at elevated temperatures.

BACKGROUND OF THE INVENTION

A number of industrial processes require selectively removing hydrogen from a reaction media. A first example of such a process is the formation of hydrogen gas by the decomposition of ammonia. Ammonia decomposes to form nitrogen and hydrogen. Removing either hydrogen or nitrogen from the system favors the decomposition of ammonia. Selectively removing hydrogen from the mixture depends on several factors, including the temperature and pressure of the reaction mixture. At high temperatures and pressures, the task of separating a particular gas from a mixture of gases requires considerable effort. Furthermore, conventional packed-bed reactors cannot decompose ammonia efficiently. This is primarily because the high concentrations of hydrogen and nitrogen gas involved in the process favor the formation of ammonia.

A second example of an industrial process that may be aided by the selective removal of hydrogen from a mixture of gases is the integrated, gasification combined cycle process (IGCC). The goal of this process is to produce a synthetic gas that is used to power a gas turbine generator. The IGCC process produces a synthetic gas stream that contains trace amounts of ammonia and other impurities, such as hydrogen sulfide ($H_2S$). "A Mathematical Model of a Catalytic Membrane Reactor for the Decomposition of $NH_3$," *J. Membrane Science*, 78:265–282 (1993). These substances must be removed from the synthetic gas stream. Otherwise, toxic nitrogen oxides ($NO_x$) are formed when the synthetic gas is burned. The temperatures involved with the process are significantly greater than can be used with conventional gas separation techniques. These temperatures also are significantly greater than the melting or combustion point of most organic membrane materials, which have an upper useful temperature range of about 150°–200° C.

Three commonly used types of membranes include polymers, ceramics and metal membranes, such as palladium or palladium-alloy membranes. Each of these types of membranes have characteristics that prevent their use for separating hydrogen from a mixture of gases at high temperatures and pressures. The low thermal and mechanical strength of polymer membranes makes them unsuitable for reactions involving gases at high pressures and temperatures. The palladium or palladium-alloy membranes are impractical on an industrial scale because of their expense, low hydrogen flux, and because metals deform at high temperatures. As used herein hydrogen flux or hydrogen permeation rate means the amount of hydrogen (molar-flow rate) per unit area of membrane. It is important to note the difference between hydrogen flux and hydrogen permeability. Hydrogen permeability is an intrinsic property of a metal that is used to determine hydrogen permeation rates at a particular hydrogen partial pressure driving force. Ceramic membranes are able to endure high temperature and pressure conditions. However, ceramic membranes allow the mixture of ammonia, hydrogen and nitrogen to flow through the membrane, rather than selectively allowing hydrogen to flow through the membrane. Hence, porous ceramic membranes are insufficiently selective for separating hydrogen from other gases at high temperatures and pressures.

Some of the problems associated with previous membranes have been overcome by combining different types of membranes to increase the overall efficiency of the combined membrane. For instance, metals, such as palladium, have been combined with a porous-glass membrane. More specifically, a thin palladium film of 20 µm or less has been deposited on the outside surface of a porous-glass tube. This overcomes the low thermal stability associated with metals while increasing the rate of hydrogen flux over glass membranes alone. Uemiya et al., "A Palladium/Porous-Glass Composite Membrane for Hydrogen Separation," *Chem. Letters*, 1687–1690 (1988). However, the glass support does not provide sufficient stability to be used at high temperatures and pressures. Furthermore, Buxbaum et al. produced a membrane comprising a 2 µm palladium film on a niobium disk. However, the Buxbaum et al. procedures are not feasibly applied to extractions of hydrogen at temperatures above about 500° C. At such temperatures, intermetallic-diffusion rates increase, thereby increasing the rate at which the niobium diffuses into the palladium metal. Such membranes eventually become impermeable to hydrogen.

Composite palladium-ceramic membranes also have been made. For instance, Uemiya et al. (Uemiya) described the formation of a composite ceramic-palladium metal membrane that was used for the aromatization of propane. Uemiya et al., "Aromatization of Propane Assisted by Palladium Membrane Reactor," *Chem. Letters*, 1335–1338 (1990). Uemiya formed the composite membrane by depositing a palladium metal layer on the outside surface of a ceramic tube. Uemiya taught a palladium metal layer having a thickness of 8.6 µm. Moreover, Uemiya specifically stated that the promoting effect of the membrane increased with increasing palladium thickness. However, Uemiya teaches nothing about (1) selectively removing hydrogen from a mixture of gases at high temperatures and pressures, or (2) selectively separating hydrogen from a mixture of gases to promote the decomposition of ammonia. The process described by Uemiya used a transmembrane pressure of about 1 atmosphere. Palladium film thicknesses of less than about 10 µm have defects when the palladium film is deposited using an electroless deposition process such as taught by Uemiya. These defects reduce the effectiveness for selectively removing hydrogen from a mixture of gases at transmembrane pressure differences of greater than about 1,000 kPa. Thus, the Uemiya membrane would not work for removing hydrogen selectively from a mixture of gases at high temperatures and transmembrane pressures such as would be encountered in the IGCC process or a process whereby hydrogen gas is formed by decomposing ammonia.

Hence, a need exists for a membrane that selectively removes hydrogen from a mixture of gases at high temperatures and pressures via a semipermeable membrane.

SUMMARY OF THE INVENTION

The present invention provides a palladium-ceramic membrane that solves the problems associated with prior membranes. The palladium-ceramic membranes of the present invention are primarily useful for selectively removing hydrogen from a mixture of gases, particularly at elevated temperatures, such as greater than about 500° C. The composite membranes comprise a porous, tubular asymmetric ceramic support having a pore size of greater than about 10 nm. The ceramic support has both an inside surface and an outside surface. A palladium metal layer is deposited on the inside surface of the ceramic support by immersing the support in a series of baths.

The first bath is a sensitizing bath. This bath apparently deposits a layer of colloidal tin ions on the inside surface of the ceramic filter. This allows an activation bath to deposit a uniform layer of finely dispersed palladium crystals on the ceramic surface. Finally, a palladium plating bath is used to deposit a uniform layer of palladium metal on the activated ceramic surface. The palladium metal layer should have a thickness of greater than about 10 μm, and even more preferably from about 11 μm to about 20 μm. Membranes of the present invention have a hydrogen-to-nitrogen selectivity that is greater than about 380 at a temperature of about 500° C. and a transmembrane pressure of about 1500 kPa. Moreover, if the palladium layer has a thickness of about 11 μm, then the hydrogen permeation rate is about 1.25 moles/ $m^2 \cdot s$ at a temperature of about 550° C.

The present invention also provides a method for separating hydrogen from a mixture of gases. The method comprises first providing a mixture of gases containing hydrogen. A membrane also is provided. The membrane comprises: (a) a porous tubular ceramic support having a pore size of greater than about 10 nm, the ceramic support having an inside surface and an outside surface; and (b) a palladium metal layer inside surface of the ceramic support wherein the thickness of the metal layer is greater than about 10 μm. A mixture of gases is flowed past the membrane so that the mixture contacts the inside surface of the ceramic support, thereby selectively removing hydrogen gas from the mixture of gases. The method may further include the step of heating the mixture of gases to a temperature of greater than about 400° C. to about 1000° C. if the high-temperature sealant can withstand temperatures of about 1,000° C., more preferably from about 550° C. to about 640° C., before the gases are flowed past the membrane.

The mixture of gases may include ammonia. If so, then the ammonia is decomposed to provide nitrogen and hydrogen. The hydrogen is selectively removed from the mixture by flowing the mixture past the membrane. When ammonia is decomposed, the method typically includes the step of placing a catalyst inside the tubular ceramic support and adjacent the inside surface. The catalyst is placed inside the ceramic filter before the step of flowing. A presently suitable catalyst for this purpose is a nickel catalyst. The mixture of gases may be a mixture of exhaust gases from the IGCC process.

A first object of the present invention is to selectively remove hydrogen from a mixture of gases.

A second object of the present invention is to provide a ceramic-palladium membrane that can selectively remove hydrogen from a mixture of gases at elevated temperatures and pressures that are typically used in industrial processes such as the IGCC process.

Still another object of the present invention is to provide a method for decomposing ammonia by catalyzing the decomposition of ammonia to nitrogen and hydrogen, and thereafter promoting the decomposition by selectively removing hydrogen from the mixture of gases.

A first advantage of membranes within the scope of the present invention is that such membranes can operate at high temperatures and pressures and still maintain a high hydrogen selectivity.

A second advantage of the present invention is hat the membranes can be used in a membrane reactor for the decomposition of ammonia, particularly at high temperatures and pressures such as may be associated with industrial processes.

DETAILED DESCRIPTION OF THE PREFERRED EMBODIMENTS

The present invention concerns hydrogen-selective ceramic membranes. A primary application for such membranes is high temperature hydrogen separations and the promotion thereby of ammonia decomposition.

The membranes comprise a thin layer of a hydrogen permeable metal, such as palladium, that is deposited on the inside of a tubular ceramic filter. The metal layer is supported by the porous ceramic tube. The metal layers preferably are deposited on the inside of the ceramic tube because that is where the smallest pores of the ceramic filter are located. Using such membranes provides a hydrogen flux and hydrogen selectivity that is significantly higher than previously reported.

I. MAKING METAL-PLATED POROUS CERAMIC MEMBRANES

Preparing the metal-ceramic membranes within the scope of this invention comprises the four following steps: (1) preparing sensitizing, activating and plating solutions; (2) pretreating the membrane; (3) activating the membrane; and (4) plating ceramic membranes using a nonelectrolytic process.

The ceramic tubes are first placed in the sensitizing bath. This bath apparently deposits a layer of colloidal tin ions on the inside surface of the ceramic filter. This allows an activating bath to deposit a uniform layer of finely dispersed palladium crystals on the ceramic membrane surface. Finally, the plating bath is used to deposit a uniform layer of palladium metal on the activated ceramic surface. The palladium metal layer should have a thickness of greater than about 10 µm, preferably from about 11 µm to about 20 µm. Each of these steps is described below in more detail.

A. BATH/SOLUTION PREPARATION

Three baths typically are used for membrane preparation. The first is a sensitizing bath, the second is an activating bath, and the third is a plating bath.

1. Sensitizing Bath

Two solutions are used to make the sensitizing bath. The first solution is an aqueous solution of tin (IV) chloride pentahydrate ($SnCl_4 \cdot 5H_2O$). The second solution is a concentrated inorganic acid solution of tin (II) chloride dihydrate. A suitable inorganic acid is concentrated hydrochloric acid. Both $SnCl_4 \cdot 5H_2O$ and $SnCl_2 \cdot 2H_2O$ are commercially available.

One skilled in the art will realize that the concentration of the tin chloride solutions may differ from the stated values and still function correctly. However, the concentration of the first solution of tin (IV) chloride typically is from about 0.05M to about 0.15M, more preferably about 0.10M. The second solution is a concentrated solution of tin (II) chloride that typically has a concentration of about 2.6M. The first solution generally is allowed to age for a sufficient period of time to form a colloidal suspension. The aging period may vary, but typically is for a period of about one week. Thereafter, the first and second solutions are combined in deionized water. More specifically, an aqueous sensitizing solution is formed using the aged tin (IV) and tin (II) chloride solutions. A presently suitable sensitizing solution contains from about 5 to about 7 volume percent, preferably about 7.5 volume percent, of the second solution, and about 4.0 to about 6.0 volume percent, preferably about 5.0 volume percent, of the aged first solution in deionized water. Example 1 below provides an example of how a sensitizing bath was made according to the present invention.

EXAMPLE 1

20.9 grams of $SnCl_4 \cdot 5H_2O$ (MW=350.58, 0.0596 moles) was dissolved in 1 liter of deionized water. This solution was allowed to age for one week. After about one week of aging, a colloidal solution was formed. This solution can be stored indefinitely before it is used to make the sensitizing bath.

587 grams of $SnCl_2 \cdot 2H_2O$ (MW=225.63, 2.60 moles) was dissolved in 780 ml of concentrated hydrochloric acid. The volume of the resulting solution was about 1 liter.

The sensitizing bath was prepared approximately one to about two hours prior to the activation process. To prepare the sensitizing bath, 96.25 ml of deionized water were added to a bath container, such as a closed container. Thereafter, 8.25 ml of aged $SnCl_2 \cdot 2H_2O$ solution were added to the deionized water, followed by 5.5 ml of $SnCl_2 \cdot 2H_2O$ solution. The final volume of the sensitizing bath was approximately 110 ml. The bath typically is contained in a glass jar or beaker. After the bath is prepared, it is periodically shaken to keep the colloidal suspension evenly distributed. Although the shelf life of the sensitizing bath may be greater than about one day, fresh sensitizing baths typically are used on a daily basis.

2. Activation Bath

The activation bath is a dilute acidic solution of palladium chloride ($PdCl_2$). Palladium chloride is commercially available from a number of sources. Presently, a particularly suitable palladium chloride concentration for this bath has been found to be about 0.5 to about 5.0 millimolar, preferably about 1.5 millimolar. Example 2 describes the preparation of such an activation bath.

EXAMPLE 2

5 ml of concentrated hydrochloric acid were added to about 995 ml of deionized water. Thereafter, 0.267 g of palladium chloride ($PdCl_2$, MW=177.31) was added to the hydrochloric acid solution. The solution was allowed to sit for several hours until the palladium chloride was substantially completely dissolved. The resulting solution can be stored indefinitely.

The solution can be used as is or can be diluted with deionized water if necessary. When dilution is desired or required, the solution is diluted using deionized water. The shelf life of the activation bath has not been determined. Presently, a fresh activation bath preferably is used on a daily basis.

3. Plating Bath

Activated palladium metal is used to form the membrane-metal composites. One skilled in the art will realize hydrogen-permeable metals other than palladium may be used for this invention. Examples of other metals that may be used include palladium alloys, such as palladium-gold and platinum. A presently suitable source of palladium for the plating bath is a tetramine palladium chloride complex [$Pd(NH_3)_4Cl_2$]. In order to deposit palladium from an aqueous solution, the palladium is preferably stabilized by forming as a palladium complex. One skilled in the art will realize that the complex is not limited to the tetramine complex described herein. However, the tetramine complex is a presently suitable source of palladium.

The tetramine complex is formed by adding ammonia to an acidic stock solution of palladium chloride. A presently suitable tetramine complex may be prepared by adding 28 weight-percent ammonia to the acidic palladium chloride stock solution. The concentration of this solution may vary and still function for its intended purpose. However, a particularly suitable palladium (II) chloride concentration has been found to be about 0.05 to about 0.06 molar.

The palladium baths are prepared by first adding about 1.75 g of the sodium salt of ethylene diamine tetracidic acid ($Na_2EDTA$) to about 25 ml of the tetramine palladium (II) chloride solution. This solution is thereafter allowed to sit for a short period of time before actually using the solution to plate a ceramic tube. This period of time is from about 0.25 hours to about 3.0 hours, more preferably about 2.0 hours. Typically, immediately prior to a plating trial, about 0.25 ml of a 1.0M hydrazine solution are added to the solution. The hydrazine acts as a reducing agent to reduce the palladium (II) to palladium (O). Example 3 describes the preparation of such a plating bath.

EXAMPLE 3

An acidic palladium stock solution first was formed by adding 20 ml of concentrated hydrochloric acid to approximately 900 ml of deionized water. Thereafter, 10 g of palladium chloride (MW=177.31, 0.0564 moles) were added to the acidic solution. The solution was allowed to sit for several hours until the palladium chloride was substantially completely dissolved. A tetramine complex solution was prepared by adding 120 ml of deionized water to 1 liter of the palladium-chloride stock solution. Thereafter, 715 ml of 28-weight-percent ammonium hydroxide were slowly added to the stock solution. This solution was allowed to sit for about 3 days.

A palladium bath was prepared by first adding 1.75 g of the sodium salt of ethylene diamine tetracidic acid ($Na_2EDTA$) to 25 ml of complex solution. This solution was thereafter allowed to sit for 2 hours before plating. Immediately prior to a plating trial, 0.25 ml of a 1.0M hydrazine solution were added to the solution.

TABLE I below shows the composition of such an electroless plating composition.

TABLE I

Typical Electroless Plating Bath Composition

| Component | Concentration |
| --- | --- |
| palladium chloride | 5.4 g/L |
| ammonium hydroxide (28 percent) | 390 mL/L |
| disodium EDTA | 70 g/L |
| hydrazine (1 molar solution) | 10 mL/L |
| pH | 11 |
| Temperature | 70 to 100° C. |
| Plating surface area | 527 cm$^2$/L |

B. CERAMIC MEMBRANES

Ceramic membranes are used primarily because of their structural integrity, their refractory nature, and chemical inertness. As sued herein, "ceramic" refers to filters such as $Al_2O_3$ filters. The term "ceramic" does not include glass filters. Moreover, ceramic membranes provide a suitable porosity for metal/ceramic membrane composites according to the present invention. Ceramic membranes provide better support than do glass membranes. Therefore, ceramic may be used for higher temperatures and transmembrane pressures required for industrial processes.

Suitable ceramic membranes for the present invention may be purchased from the U.S. Filter Corporation of Warrendale, Pa. Particularly suitable ceramic membranes may be obtained from the U.S. Filter Corporation as MEMBRALOX® T170 ceramic filters. However, one skilled in the art will realize that other ceramic filters also may be suitable for this invention. A second example of a filter that may be suitable is a multiple-channel ceramic membrane monolith, which also is available from the U.S. Filter Corporation. MEMBRALOX® T170 ceramic filters are alumina ($Al_2O_3$) support-tube filters. The support tube has an inner surface that is covered by a thin multiple-layer microporous membrane. The pore size of the membrane may vary. "Pore size" as referred to herein refers to the pore diameter of the inside layer of the composite ceramic membrane discussed above, because this is the selective layer. Suitable pore diameters for this invention are from about 10 nm to about 200 nm. Presently preferred membranes have a pore size closer to about 200 nm because these ceramic membranes were found to be more durable than the 10 nm pore membranes.

MEMBRALOX® T170 ceramic filters are available in lengths of from about 25 to about 75 cm. For typical applications according to the present invention, ceramic filters having lengths of 5 to about 6 cm were used. Tubes having a length of from about 5 to about 6 cm were convenient for both plating and permeation trials. However, one skilled in the art will realize that tubes of various sizes may be used. Tubes having a length of from about 5 to about 6 cm were convenient for both plating and permeation trials. There is nothing critical about the 5 to 6 cm tube length discussed herein. Prior to plating, the ceramic filters were cut to the desired length using a diamond saw. The filters thereafter were sanded and cleaned.

1. Membrane Pretreatment

In general, membrane pretreatment involves cutting the ceramic tubes, polishing the tubes, and sealing the ends of the tubes. One skilled in the art will realize that more than one cleaning procedure will work. However, a particularly suitable cleaning procedure involves the following steps: first, the ceramic tubes are rinsed ultrasonically using a sonicator and deionized water. Ultrasonic rinsing is continued for approximately five minutes. Thereafter, an ultrasonic rinse is performed using an alkaline solution. After the ceramic tubes are clean, the ends of the tube are sealed using a sealant that can withstand high-temperatures, i.e. greater than about 527° C. The ends of the ceramic tubes are sealed to prevent the gas from passing through the membrane inlet or outlet. The sealant typically is applied to each end of the ceramic tube, from about 0.25 to about 1.0 cm from each end of the inside of the tube. The sealant also is applied around the outer ends and the outside of the tube at a distance from about 1.5 to about 2.0 cm from each end of the ceramic filter. Although any method of applying the sealant will suffice, a suitable method for applying sealant is by using a fine paint brush.

After the sealant is applied, it is typically cured at room temperature for about one hour. Thereafter, the sealant-coated ceramic filters are heated to a temperature of from about 750° C. to about 800° C., more preferably about 780° C., at a heating rate of about 6° C./minute ramp rate. The oven is held at a presently preferred temperature of about 780° C. for a period of time of from about 10 to about 20 minutes, more preferably about 15 minutes. Thereafter, the oven is allowed to cool to a temperature of about 100° C. The sealing procedure is repeated. Thus, a presently suitable sealing procedure involves applying more than one coat of sealant, and preferably involves applying at least two coats of sealant. Example 4 provides an example of membrane pretreatment.

EXAMPLE 4

MEMBRALOX® Ceramic tubes were obtained from the U.S. Filter Corporation. The tubes were cut to a length of about 5 to about 6 cm using a diamond saw. After the T170 filters were cut, the filters then were sanded to obtain an outer diameter that fit into compression fittings. The outside diameter of the sealed ceramic filters was decreased to 9.7 mm by sanding the outside of the ceramic tube. During sanding, one end of each ceramic tube was secured in a 10 mm to ¼" SWAGELOK reducing union having nylon ferrules. A ¼" outside diameter stainless-steel tube was attached to the ¼"-end of the reducing union. The stainless-steel tube then was put in a drill chuck. The drill was set to a low speed and the outside of the tube is gently sanded until the outside diameter of the ends were about 9.7 mm. This sanding procedure was performed on each end.

The tubes were then placed in a sonicator containing deionized water. The tubes were left in the sonicator for a period of about 15 minutes. An alkaline cleaning solution was prepared by dissolving approximately 0.25 g ALCONOX in about 250 ml of deionized water. ALCONOX is a detergent that can be obtained from a number of commercial vendors. The deionized water was at a temperature of about 50° C. before the ALCONOX was added. Thereafter, 10 ml of 28-weight-percent ammonia were added to the solution. 250 ml of cold deionized water were added to complete the solution.

A sufficient amount of this alkaline solution was added to substantially fill the sonicator, and the ceramic tubes then were placed in the solution. The sonicator was continued for a period of five minutes. The ceramic filters were thereafter rinsed with cold deionized water for one minute. Thereafter, the ceramic filters were immersed in acetic acid (25 wt. %) for five minutes. The ceramic filters were again ultrasonically rinsed in cold deionized water for three minutes, followed by an ultrasonic rinse in 60° C. deionized water for one minute. Finally, the ceramic filters were ultrasonically rinsed in isopropyl alcohol for five minutes.

After the ceramic tubes were cleaned according to the process described above, they are then sealed using a high-temperature (above about 500° C.) sealant. "Sealed" as used herein refers to coating each end of the ceramic tube with a sealant that can withstand temperatures of greater than about 500° C. This prevents gases from leaking through the ceramic membrane when the ends of the ceramic tube are sealed with compression fittings and the ceramic tube is charged with a mixture of gases at higher temperatures. A presently suitable sealant is an Aremco 617 sealant. The sealant is applied to each end of the ceramic tube from a distance of about 0.25 to about 1.0 cm from each end of the inside of the tube. The sealant also was to the outside of the tube at a distance from about 1.5 to about 2.0 cm from each end of the ceramic filter. Although any method of applying the sealant will work, a suitable method for applying sealant is by painting the sealant on the ceramic tube using a fine paint brush. The sealant is cured at room temperature for about one hour. Thereafter, the sealant-coated ceramic filters were heated to about 780° C. at a heating rate of about 6° C./minute. The oven was held at a temperature of about 780° C. for a period of time of about 15 minutes. The oven was allowed to cool to a temperature of about 100° C. The sealing procedure was then repeated.

2. Membrane Activation

The inside surface of the ceramic membrane must be uniformly seeded with a metal, such as palladium crystals. The selective membrane of the ceramic filter is on the inside of the tube. Plating the ceramic tube requires using both the sensitizing and activation baths described above. The sensitizing bath deposits a colloidal layer of tin ions on the inside surface of the ceramic tube. The tin layer provides a foundation for depositing palladium at discrete locations on the tin surface using an activation bath which presently is a dilute solution of $PdCl_2$. Finally, a plating bath is used to deposit a uniform layer of palladium metal on the activated ceramic surface.

It is important to prevent the activation of the outside surface of the membrane. Hence, the outside surface of the ceramic filters typically are covered prior to seeding with palladium crystals. Presently, a particularly suitable coating method comprises wrapping the outside surface of the tube with TEFLON tape.

EXAMPLE 5

To activate the membrane, the ceramic filter first was soaked in a sufficient amount of sensitizing bath to substantially cover the tubes immersed therein. The tubes were left in the sensitizing bath for a period of about five minutes. Thereafter, the ceramic filter first was rinsed with deionized water, and then immersed in an activating bath for about five minutes. Again, the ceramic filter was rinsed with deionized water after being removed from the activation bath. This procedure was repeated seven times, although the actual number of platings may vary from trial to trial. The purpose of repeated platings is to achieve a uniform distribution of the palladium crystals on the inside surface of the ceramic membrane. Presently, a suitable number of coatings is about seven times. The activated surface was light brown in appearance. Following activation, the TEFLON tape was removed and the membrane was rinsed in deionized water.

3. Membrane Plating

TEFLON tape again is wrapped around the outside of the tube to protect the sealant from the plating bath. Hydrazine is added to the plating bath immediately prior to immersing the membrane therein. Although any suitable container will suffice for the plating bath, a particular suitable plating bath container was a 30 ml glass vile having a screw on cap. The membrane is added to the 30 ml glass vile, and the cap was loosely screwed back on the container. The container thereafter is heated to a temperature of from about 70° to about 80° C. Presently, a particularly suitable method for heating the closed container comprises placing the closed container in a water bath heated to about 70° to about 80° C. Heating the solution during the plating procedure to a temperature of from about 70° C. to about 80° C. appears to provide a more uniform deposit of palladium. The vile is gently shaken periodically. The membrane is allowed to remain in the heated water bath for a period of time of about one hour.

After the first plating procedure, the membrane is rinsed off using deionized water, and fresh TEFLON tape is applied. The ceramic filter then is placed in a fresh plating bath for another hour of plating. This process is repeated until a desired plating film thickness is obtained. An approximate plating deposition rate is about 2.5 μm per hour when 6 cm samples are plated. After plating, the membrane is again rinsed with deionized water and then dried at a temperature of about 110° C. The palladium film thickness can be estimated by measuring the weight difference between the initial and final membranes.

The thickness of the deposited palladium layer may be greater than about 10 μm to about 20 μm.

Figure 1:
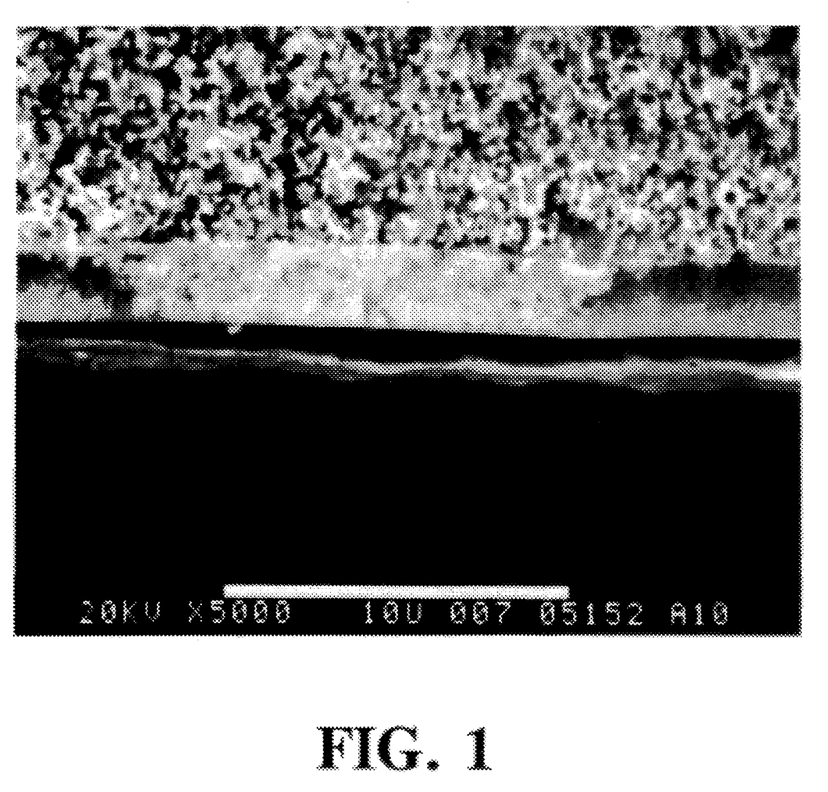
FIG. 1 is a scanning electron micrograph of a palladium film deposited on a 10 nm pore size asymmetric $Al_2O_3$ support.

FIG. 1 is a scanning electron micrograph of asymmetrical $Al_2O_3$ membrane having a 10 nm pore top layer. FIG. 1 shows that a palladium layer actually was deposited on the inner surface of a ceramic filter using the process of the present invention. The top horizontal band or section shown in FIG. 1 is the porous supportive ceramic membrane. The bottom section represents the palladium layer. The thickness of the palladium layer deposited on the ceramic membrane shown in FIG. 1 was about 1.5 μm.

Palladium plated ceramic membranes made according to the method described above have been tested to determine whether they delaminate. Palladium plated ceramic membranes have been heated to about 600° C. and cooled with no observable delamination of the metal films.

II. MEMBRANE CHARACTERIZATION

Membranes were tested to determine their hydrogen permeability and selectivity. These tests were conducted using hydrogen, nitrogen and helium gases.

Figure 2:
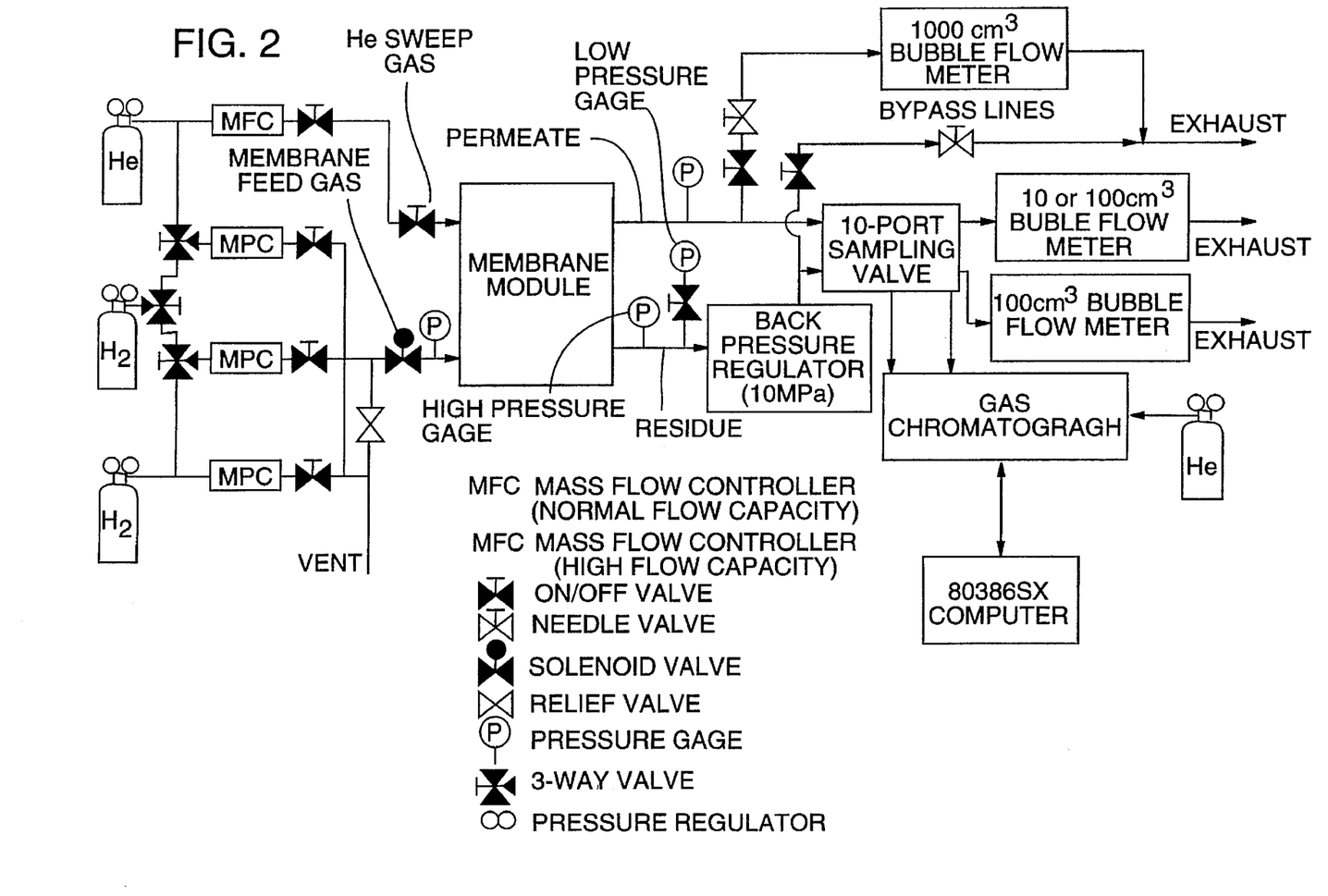
FIG. 2 is a schematic drawing of a gas-flow system used to evaluate the permeability and selectivity of membranes made according to the present invention.
Figure 3:
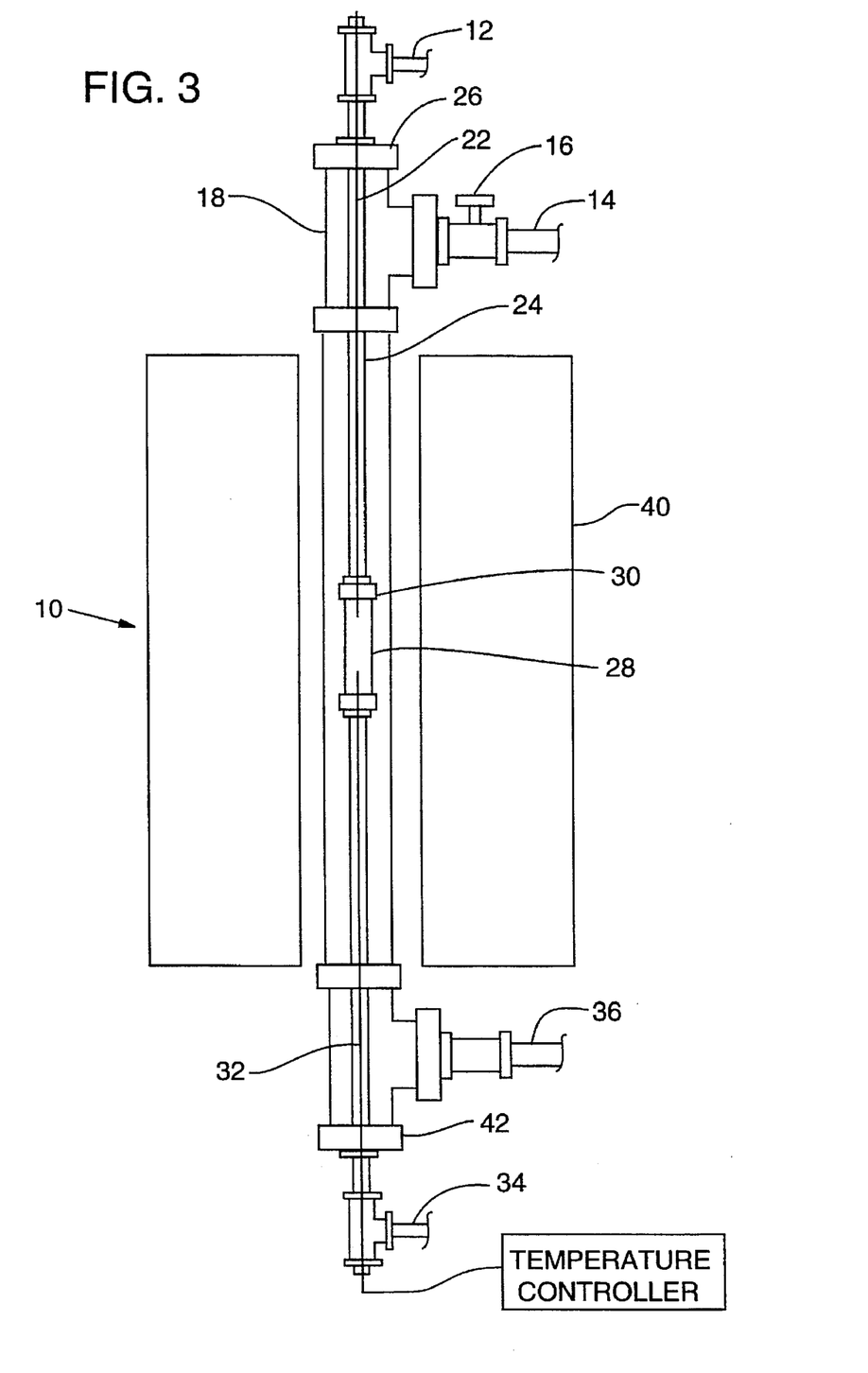
FIG. 3 is schematic side sectional view of a membrane module used for permeation trials with membranes according to the present invention.

The apparatus used to test the permeability and selectivity of membranes is shown in FIGS. 2 and 3. FIG. 2 is a schematic representation of a flow system used for the permeation trials. FIG. 2 shows that nitrogen hydrogen and helium gases were connected to a membrane module 10. The membrane module 10 is shown in more detail schematically in FIG. 3. Sources of hydrogen, helium and nitrogen gases were connected to the membrane module using feed lines and mass flow controllers. Although any suitable mass flow controller may be used for this invention, particularly suitable mass flow controllers are Brooks 5850E mass flow controllers. These controllers were used to regulate the gas flow, as well as determining the gas compositions of the gas introduced to the membrane module 10. Helium was used as both a sweep gas and as a membrane feed gas, whereas nitrogen and hydrogen were used solely as membrane feed gases. The feed gases were fed through the membrane module 10 shown in FIG. 3. After the gas passed through the membrane module 10, it was then fed to a 10-port sampler. From the sampler, the exhausted feed gas was analyzed by a Hewlett Packard 5890 Series II chromatograph having TCD detectors.

The permeability of membranes made according to this invention were tested using a membrane module as shown in FIG. 3. Module 10 comprises a tube inlet 12 that is connected to the feed gases using any suitable connector. Module 10 also includes a shell inlet 14 for the sweep gas, which typically is helium. As used herein, "sweep gas" refers to a gas that passes through shell inlet 14 and passes by the ceramic membranes adjacent to the outside surface of the membrane. The inlet gas is fed through the interior of the ceramic membrane adjacent to the inside, palladium coated surface of the membrane. Controlling the flow through the sweep inlet 14 is a valve 16. Tube inlet 12 is connected to a tube 18 using compression fittings. Although one skilled in the art will realize that any suitable compression fitting may be used for this invention, particularly suitable compression fittings are SWAGLOK® compression fittings. The SWAGLOK® fittings include Grafoil or graphite seals.

Tube 18 typically is an alumina tube or a metal tube having an outer diameter of about 2.5 cm. Located inside tube 18 is a first thermocouple 22. This thermocouple 22 is used to monitor the temperature of the inlet gas. A presently suitable thermocouple is a Type K thermocouple, which is available from Omega. Also located inside the tube 18 is a second alumina tube 24 that is connected to the inlet 12. Tube 24 presently is a 0.64 cm outer-diameter nonporous alumina tube. Tube 24 passes through the center of tube 18 and through cap 26. Furthermore, tube 24 leads to a first end of a membrane 28 made according to the present invention. The membrane 28 is connected to alumina tube 24 using metal compression fittings 30. These compression fittings also include Grafoil or graphite seals (not shown). The alumina tube 24 also is connected to a second end of the membrane 28, again using compression fittings and Grafoil or graphite seals. Tube 24 continues through the center of tube 18.

A second thermocouple 32, preferably a Type K thermocouple, is positioned to monitor the temperature of the outlet gas as it passes from the membrane 28. The temperature of the gas at the inlet was higher than at the outlet, presumably because of a non-uniform temperature distribution within the furnace 40. The maximum temperature difference measured between the inlet and the outlet was about 20° C. Hence, membrane temperature as referred to herein means the average of the inlet and outlet temperatures. Tube 24 thereafter passes through a cap 42 and through tube outlet 34. Only the gas that passes through membrane 28 passes through outlet 34. The sweep gas is exhausted out shell outlet 36. Tube 24 also is connected to a temperature controller 38. This temperature controller 38 was used to regulate the temperature of the membrane 28. A particularly suitable temperature controller is an Omega CN9000 controller. The membrane module 10 is located inside a high temperature furnace 40. This furnace 40 is used to heat the membrane to the desired working temperature.

1. Permeability Tests

Permeability tests were performed on various composite membranes. The membranes were tested at numerous temperatures ranging from about 450° C. to about 640° C. The upper temperature limit was determined primarily by the operating temperatures of the Aremco 617 end seals. The gas feed pressures also were varied. The feed pressures ranged from about 156 kPa to about 2445 kPa, whereas permeate pressures ranged from about 101 kPa to about 140 kPa. Transmembrane pressure differences ranged from about 40 kPa to about 2330 kPa.

Gas permeabilities were determined by flowing a substantially pure gas through the membrane at various pressures. When hydrogen and helium were tested, or when mixtures of hydrogen, nitrogen and helium were tested, a sweep gas was not employed. However, a sweep gas was used to test the permeability of nitrogen.

Membranes having palladium layers of from about 10 µm to about 20 µm have been made and tested. Membranes having palladium films of from about 11.4 µm to about 20 µm were used for the high-temperature tests, that is temperatures greater than about 427° C. Prior to subjecting the membranes to high-temperature tests, the membranes first were subjected to ambient temperature tests. These tests were conducted by pressurizing membranes with nitrogen up to a pressure of about 240 kPa. The pressurized tubes then were immersed in water to determine if there were any leaks in the membranes tested. These tests indicated that membranes having a palladium layer less than about 10 µm thick leaked nitrogen. Hence, membranes having a palladium-layer thickness of less than about 10 µm would have a lower hydrogen selectivity than membranes having a greater thickness. For this reason membranes having palladium layers with a thickness less than about 10 µm were not tested at elevated temperatures. Moreover, membranes having a palladium layer of greater than about 10 µm are preferred membranes for high-temperature, high-pressure gas separations due to their higher hydrogen selectivity.

To permeate through the composite membranes of the present invention, the gas must permeate through both the palladium metal film and the ceramic membrane support. Hence, hydrogen permeabilities for 4 nm MEMBRALOX® ceramic supports were estimated using the permeability data presented by Wu et al. Wu et al., "High-Temperature Separation of Binary Gas Mixtures Using Microporous Ceramic Membranes," *J. Membrane Sci.*, 77:85–98 (1993). It is important to note that Wu et al. used only a 4 nm ceramic membrane, as opposed to a composite metal-ceramic membrane. With such a membrane the hydrogen permeation rate is on the order of about 23 to 44 times the permeation rate for composite membranes made according to the present invention. At low transmembrane pressure differences and high temperatures, gas transport through these ceramic membranes occurs primarily by Knudsen flow. The hydrogen/nitrogen selectivity under Knudsen flow conditions is only 3.74. As the transmembrane pressure difference increases, viscous flow also becomes important, which results in a decrease in the already-low hydrogen selectivity.

Therefore, the hydrogen selectivity of the ceramic membrane is much too low to make it feasible to use in a membrane reactor for ammonia decomposition and the separation of hydrogen from gas mixtures at high temperatures and transmembrane pressure differences. Moreover, because the permeation rates of Wu et al. are so high, it was assumed that the mass transfer resistance of the ceramic support is minimal, and that the hydrogen permeability rates measured using the composite membranes of the present invention reflect the permeability of the palladium film deposited on the ceramic support.

Either pure hydrogen, nitrogen or helium was fed to the membrane. Alternatively, mixtures of hydrogen, nitrogen and helium were used having various mole-percent compositions. It was important to determine the composition of the outlet gas streams. To determine the composition of such streams, the outlet gas streams were coupled to bubble flowmeters and a gas chromatograph as discussed above. In general, large amounts of hydrogen gas were permeated to the sweep side relative to nitrogen and helium gas.

The results of hydrogen permeation rates with three composite membranes are shown below in TABLE II.

TABLE II

Hydrogen Permeabilities at Specific Temperatures for Composite Palladium-Ceramic Membranes

| Membrane Number and Description | Temperature | $P_H$ (moles · m/m² · s · Pa$^n$) | n |
|---|---|---|---|
| 1. 20 μm palladium film on ceramic membrane with 10 nm pore layer | 550 | 1.43 · 10$^{-8}$ | 0.526 |
| 2. 17 μm palladium film on ceramic membrane with 200 nm/// pore layer | 450 | 2.34 · 10$^{-9}$ | 0.622 |
|  | 500 | 4.04 · 10$^{-9}$ | 0.595 |
|  | 550 | 6.82 · 10$^{-9}$ | 0.568 |
|  | 600 | 9.96 · 10$^{-9}$ | 0.552 |
| 3. 11.4 μm palladium film on ceramic membrane with 200 nm pore layer | 550 | 3.23 · 10$^{-9}$ | 0.602 |
|  | 600 | 5.84 · 10$^{-9}$ | 0.566 |

Note:
Hydrogen permeabilities calculated from nonlinear regression of Equation 1 using permeating data collected at each temperature.

Equation 1 below describes the hydrogen flux (hydrogen permeation rate through a palladium film):

$$J = P_H/t_m(P_{Ht}^n - P_{Hs}^n)$$ Equation 1

J is the hydrogen permeation rate as expressed in moles/m².s. $P_H$ is the hydrogen permeability at a given temperature in units of moles.m/m².s.Pa$^n$. $t_m$ is the palladium film thickness in meters. $P_{Ht}$ is the partial pressure of hydrogen on the tube side, whereas $P_{Hs}$ is the hydrogen partial pressure on the permeate side. Finally, n is the pressure dependence term. A value of 0.5 occurs when permeation through the metal film follows Sievert's Law.

The hydrogen permeation rates were dependent on the hydrogen pressure to the 0.526 to 0.622 power, very close to the 0.5 power dependence expected from Sievert's Law. The variation of n with temperature and palladium film thickness is due to several factors. Permeation of hydrogen through palladium metal involves several steps (Shu et al., 1991):

1) reversible dissociative chemisorption of molecular hydrogen on the membrane surface;

2) reversible dissolution of surface atomic hydrogen in the bulk layers of the metal;

3) diffusion of atomic hydrogen through the bulk metal.

Steps 1 and 2 take place on both surfaces of the metal. Sievert's Law is only applicable when diffusion through the bulk metal controls the permeation rate and hydrogen atoms form an ideal solution in the palladium metal. Deviation from this behavior increases the value of n. In practice, n depends on temperature since it is influenced by the relative rates of the surfaces processes and diffusion through the bulk metal, which all depend on temperature. The palladium film thickness also impacts n since the relative rates of surfaces processes and bulk diffusion also depend on the palladium film thickness. Surface processes become more important when the palladium film thickness is reduced since the diffusion length decreases as the film thickness decreases.

Figure 4:
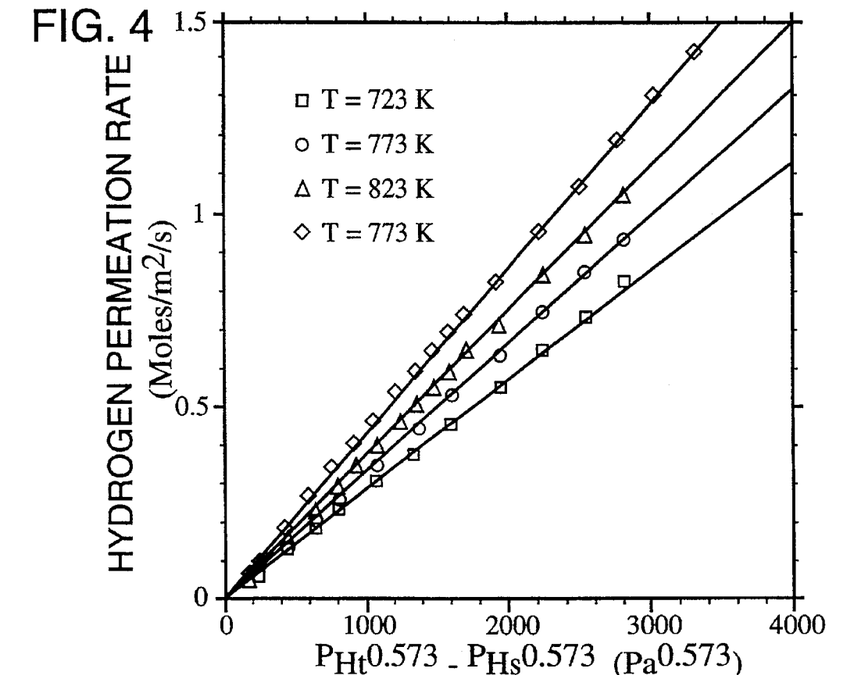
FIG. 4 is a graph of the hydrogen permeation rate for a composite membrane made according to the present invention having a 17 μm palladium layer.

FIG. 4 is a graph of the hydrogen-permeation rate (mole/m²/s) as a function of temperature between the temperatures of 450° C. and 600° C. More specifically, FIG. 4 shows the permeation rate of hydrogen through membrane 2 at 450° C., 500° C., 550° C. and 600° C. This membrane has a palladium layer thickness of about 17 μm. The membrane was operated for over 200 hours at temperatures over about 450° C. without failure. The membrane was first tested at a temperature of about 450° C., and then tested sequentially at the higher temperatures. Hydrogen permeabilities were determined at each of these temperatures using the apparatus shown in FIGS. 2 and 3. As can be seen from the data shown in FIG. 4, the permeabilities of the membranes increased with increasing temperatures. When the membrane was cooled back down to 450° C., the hydrogen permeability had increased relative to the permeability initially measured at 450° C. More specifically, the hydrogen permeability increased from about 20 to about 40 percent over the initially determined permeation rate, depending upon the temperature at which the permeability rate was measured.

Without limiting the invention to one theory of operation, one possible explanation for the increased permeation rates was that impurities initially present in the membrane were burned off during the first high-temperature tests. A second possible explanation is that the heating process may have had an annealing effect on the palladium surface. For whatever reason, it appears that the permeation rates of the membranes may be improved by including a high-temperature heat treatment step. High-temperature as used herein means a temperature of at least about 400° C., and preferably greater than about 500° C. to about 640° C.

Figure 5:
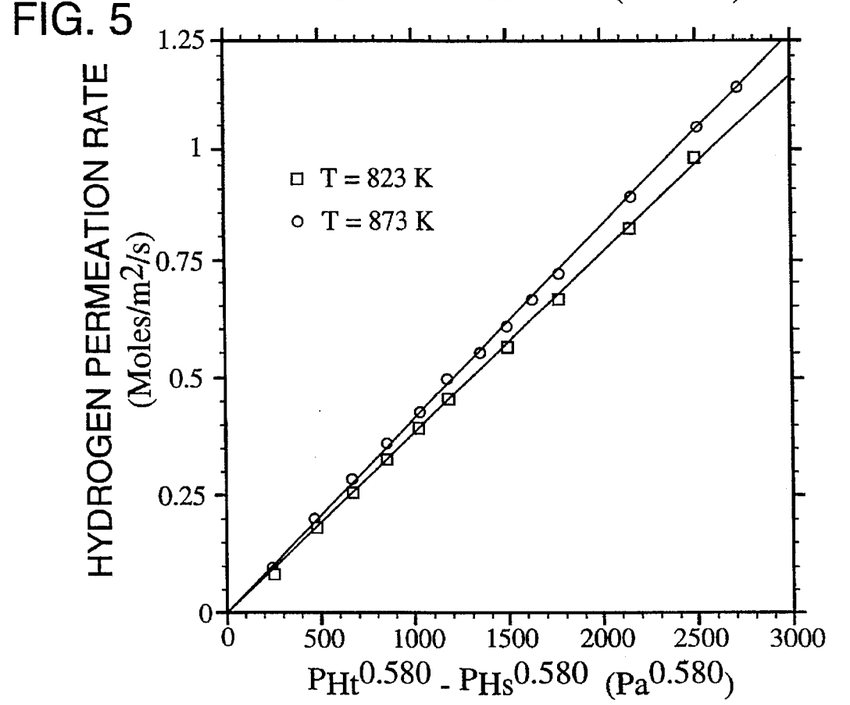
FIG. 5 is a graph of the hydrogen permeation rate for a composite membrane made according to the present invention having a 11.4 μm palladium layer.

FIG. 5 shows the hydrogen permeability results for a membrane having a palladium thickness of about 11.4 μm. FIG. 5 shows the data for hydrogen permeability for this membrane at two temperatures, namely 550° C. and 600° C. The hydrogen permeability increases as the temperature increases. Furthermore, this FIG. 5 shows that as the hydrogen partial pressure difference increases across the ceramic membrane, the hydrogen permeation rate also increases.

Figure 6:
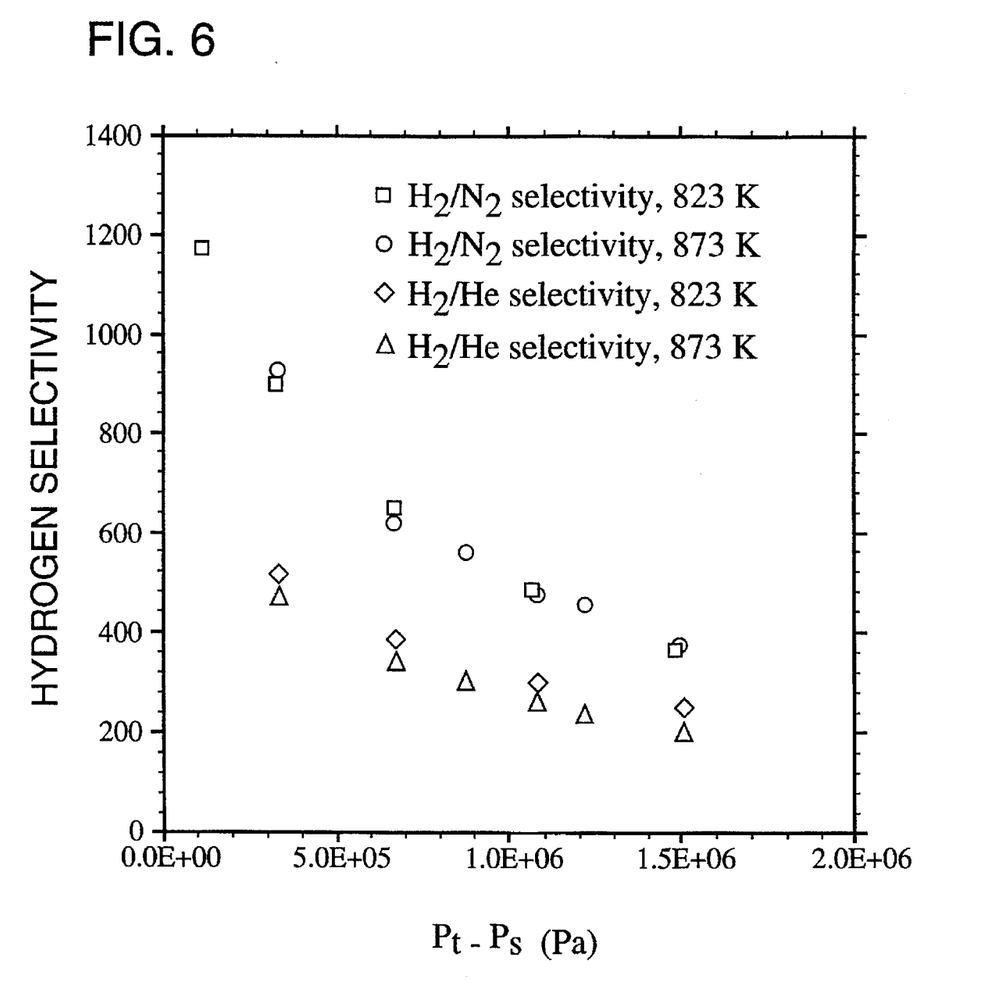
FIG. 6 is a graph of the hydrogen selectivity at different temperatures and transmembrane pressures for a composite membrane made according to the present invention having a 11.4 μm palladium layer thickness.

FIG. 6 shows the hydrogen selectivity data for composite palladium-ceramic membrane with a 11.4 μm palladium film. "Selectivity" as used herein is defined as the ratio of the hydrogen permeation rate to either the nitrogen or helium permeation rates at the same transmembrane pressure difference. The hydrogen selectivity for membranes decreases with increasing transmembrane pressure differences. This apparently is because the permeation rate of nitrogen and helium through membrane seals or palladium film defects is proportional to a higher power of pressure than is the hydrogen permeation rate through the palladium film. Defects in the palladium film layer increase with decreasing thickness which is another reason why palladium layers greater than about 10 μm are preferred. FIG. 6 shows the hydrogen selectivity of the 11.4 μm palladium layer membrane relative to nitrogen and helium at 550° C. and 600° C., and at different transmembrane pressure differences ($P_t-P_s$). $P_t$ is the total pressure on the membrane side, and $P_s$ is the total pressure on the sweep side. The hydrogen selectivity for this membrane relative to nitrogen ranges from about 1200 to about 380 over the transmembrane pressure differences tested. It can be seen from this FIG. 6 that as the pressure difference increases the selectivity decreases. It also can be seen from FIG. 6 that the membranes are more selective for hydrogen than both helium and nitrogen.

Figure 7:
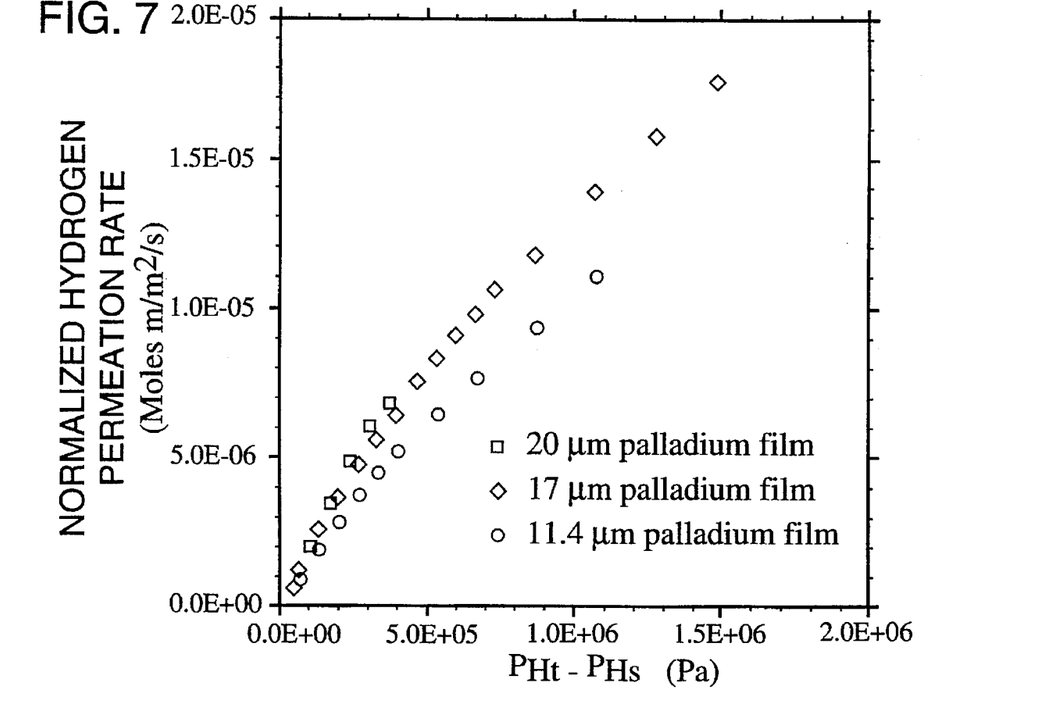
FIG. 7 is a graph of the normalized hydrogen permeation rates at different transmembrane pressures for composite membranes made according to the present invention having palladium-layer thicknesses of 11.4 μm, 17 μm and 20 μm.

FIG. 7 is a comparison of normalized permeation rates at 550° C. for composite palladium-ceramic membranes made according to the present invention. "Normalized" as used herein means that the hydrogen permeation rates were divided by the palladium layer thickness. FIG. 7 shows the normalized permeation rates at 550° C. as a function of transmembrane pressures. This FIG. 7 shows that the normalized permeation rates for the 11.4 μm palladium film were significantly lower than the permeation rates for membranes having thicker layers of palladium.

The lower normalized permeation rates are believed to be due to the effect of surface processes on the hydrogen permeation rates for the 11.4 μm palladium film. Hydrogen permeation rates should be inversely proportional to the palladium film thickness if diffusion through the bulk palladium metal controls the permeation rate. The normalized permeation rates would then be equal for all palladium film thicknesses. However, surfaces processes start to influence the hydrogen permeation rate when the film thickness is reduced below a certain value. This means that hydrogen permeation rates should approach a limiting value when the palladium film thickness is reduced below a certain point. The lower normalized hydrogen permeation rates for the 11.4 μm palladium film may indicate that surfaces processes are starting to influence the hydrogen permeation rate. Therefore, normalized hydrogen permeation rates are lower for the 11.4 μm membrane but hydrogen permeation rates are still higher than for the 17 and 20 μm films. Furthermore, decreasing the palladium film thickness below 11.4 μm should not significantly increase hydrogen permeation rates since surfaces processes become increasingly important as the film thickness is lowered. Thus, it is preferable to use an 11.4 μm palladium film rather than a thicker film since higher hydrogen permeation rates are obtained and the hydrogen selectivity is just as good as with the thicker palladium films.

TABLE III compares composite membranes of the present invention with membranes currently available. The membranes tested included: (1) Uemiya et al.'s composite palladium-porous glass membrane having a 13 μm palladium film layer ("A Palladium/Porous-Glass Composite Membrane for Hydrogen Separation," *Chem. Lett.*, 1687–1690 (1988)]; (2) Edlund's 25 μm palladium film on vanadium film ["A Membrane Process for Hot-Gas Cleanup and Decomposition of $H_2S$ to Elemental Sulfur," *Phase I Final Report to the U.S. Department of Energy*, (1992)]; (3) Buxbaum's 2 μm palladium film on 0.2 cm thick niobium disk ["Hydrogen Extraction Via Non-Porous Coated-Metal Membranes," Preprint for paper presented at AIChE Annual Meeting (1992)]; (4) Tsapatis et al.'s $Sio_2$ deposited on Vycor glass membrane ["Synthesis of Hydrogen Permselective SiO2, $T_iO_2$, $Al_2O_3$ and $B_2O_3$ Membranes from the Chloride Precursors," *Ind. Eng. Chem. Res.* 30:2152–2159 (1991)]; and (5) Wu et al.'s asymmetric ceramic membrane with 4 nm pore top layer ["High-Temperature separation of Binary Gas Mixtures Using Microporous Ceramic Membranes," *J. Membrane Sci.*, 77:85–98 (1993)].

TABLE III shows that the hydrogen permeation rates for the membranes according to the present invention are superior to the permeation rates obtained by other membranes, other than the ceramic membrane made by Wu et al. However, the Wu et al. membrane is a non-selective membrane, and hence is not capable of separating hydrogen from a mixture of gases as are the membranes of the present invention. More specifically, the hydrogen permeation rates for the composite membranes of the present invention was found on the average to be about 0.71 moles/$m^2$.s at a transmembrane pressure difference of about 690 kPa. The next-best permeation rate was obtained by Uemiya et al. at 0.59 moles/$m^2$.s. This permeation rate is similar to the permeation rate obtained with the composite ceramic-palladium membranes of the present invention if temperature differences are considered. However, the Uemiya membrane is a glass composite. Glass-composite membranes will not withstand the high temperatures and high pressures used for processes such as the IGCC process. The hydrogen permeation rate for Edlund's membrane was about 0.30 moles/$m^2$.s. Again, this value is significantly lower than the hydrogen permeation rate obtained by the composite membrane made according to the present invention, even though the temperature of the Edlund test was about 150° C. higher. Finally, the hydrogen permeation rates for the Buxbaum and Tsepatis et al. membranes are from about seven-fold slower (for the Buxbaum membrane, 0.09 moles/$m^2$.s) to about 47 times slower (for the Tsepatis et al. membrane, 0.015 moles/$m^2$.s) than with the membranes of the present invention.

TABLE III

Comparison of Hydrogen Permeation Rates for Inorganic Membranes

| Membrane Description | Temperature | Hydrogen Permeation Rate (moles/$m^2 \cdot s$) | References |
| --- | --- | --- | --- |
| composite palladium-ceramic membrane (11.4 μm palladium film) | 823 | 0.71 | this work |
| composite palladium-porous glass membrane (13 μm palladium film) | 773 | 0.56[b] | Uemiya et al. (1988) |
| composite metal membrane (25 μm palladium film on 30 μm vanadium foil with 1 μm intermetallic diffusion barrier between palladium and vanadium) | 973 | 0.30[c] | Edlund (1992) |
| composite metal membrane (2 μm palladium film on 0.2 cm thick niobium disk) | 698 | 0.09[b] | Buxbaum (1992) |
| metal oxide membrane ($SiO_2$ deposited in pores of 4 nm Vycor glass membrane) | 723 | 0.015[b] | Tsapatis et al. (1991) |
| ceramic membrane (asymmetric membrane with 4 nm pore top layer) | 811 | 23[b] | Wu et al. (1993) |

Footnotes
[a]Permeation rates are based on a feed pressure of pure hydrogen equal to 790610 Pa and a permeate pressure of 101325 Pa.
[b]Permeation rates estimated from hydrogren permeability data reported in cited references.
[c]Permeation rate taken directly from cited reference.

III. MEMBRANE REACTOR

Figure 8:
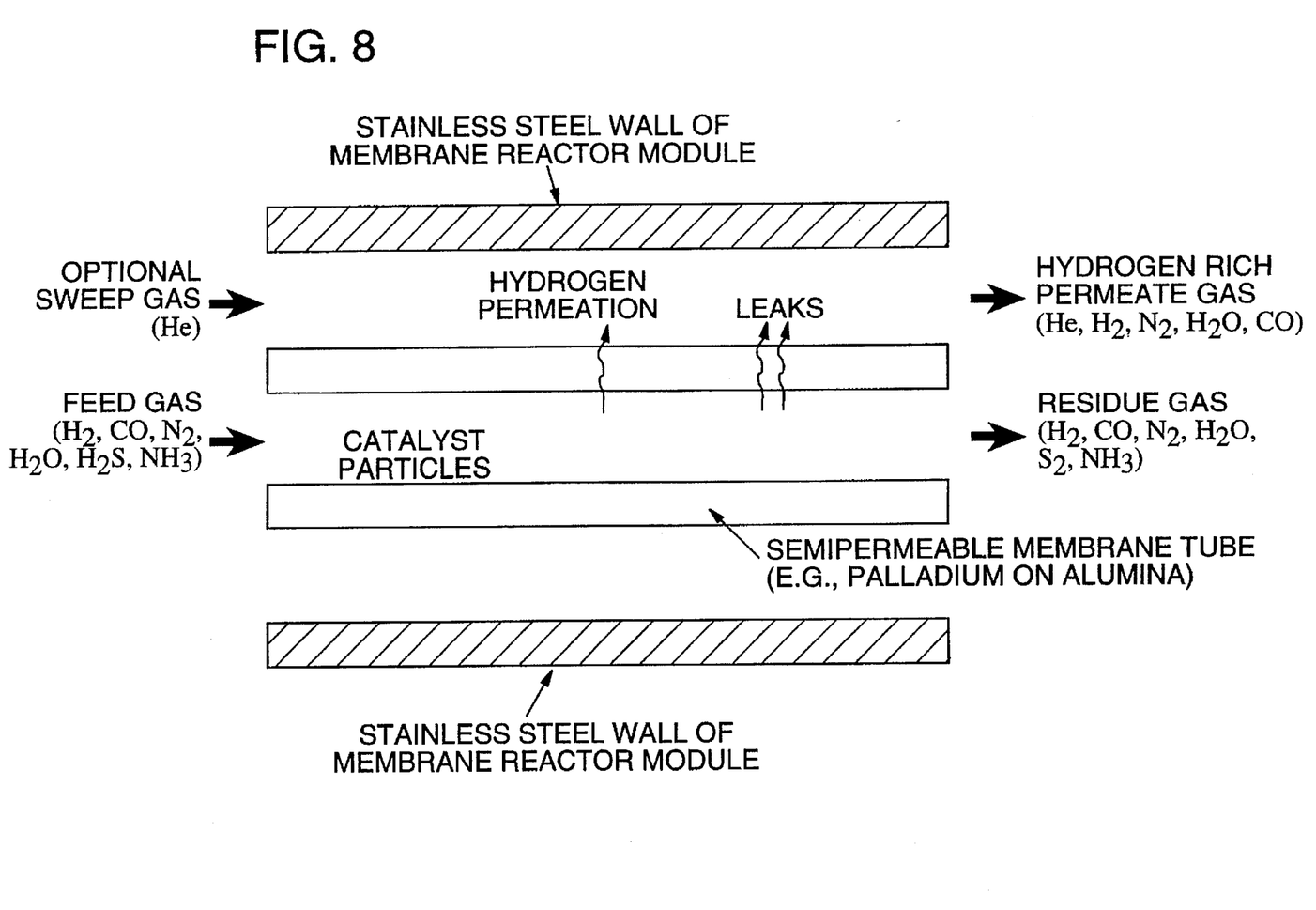
FIG. 8 is a schematic drawing of flow streams for a membrane reactor system.

Experiments have been conducted to verify that the membranes made according to the present invention can be used to increase the decomposition of ammonia relative to conventional techniques. A nickel catalyst on supported alumina was used to decompose ammonia. The reactor used to test the membranes consisted of a shell and tube configuration as shown in FIG. 8. FIG. 8 shows that the feed gas could include a mixture of hydrogen, nitrogen, carbon monoxide, water, hydrogen sulfide and ammonia. Ammonia decomposition experiments used only ammonia, nitrogen, hydrogen and helium as the inlet gas. Either hydrogen sulfide or ammonia can be decomposed using the reactor by choosing an appropriate catalyst. There is some concern that hydrogen sulfide might poison a palladium catalyst. However, Goltsov et al.'s U.S. Pat. No. 3,881,891 states that adding water vapor to a mixture of gases prevents palladium or palladium-alloy poisoning. The IGCC process provides a mixture of gases that includes both hydrogen sulfide and water vapor. The water vapor should prevent palladium poisoning by hydrogen sulfide, thus allowing decomposition of both ammonia and hydrogen sulfide using a membrane reactor within the scope of the present invention. FIG. 8 shows that hydrogen gas resulting from the decomposition of ammonia permeates through a semi-permeable membrane taught by the present invention.

TABLE IV

EXPERIMENTAL CONDITIONS FOR MEMBRANE REACTOR EXPERIMENTS

| Feed composition (mol %) | Membrane Reactor | Conventional Reactor |
|---|---|---|
| $NH_3$ | 0.34 | 0.34 |
| $N_2$ | 47.6 | 47.6 |
| $H_2$ | 20.1 | 20.1 |
| He | 32.0 | 32.0 |
| Feed flow rate (sccm) | 422 | 422 |
| Feed pressure (psig) | 220 | 220 |
| Feed temperature (°C.) | 450–600 | 450–600 |
| Shell-side pressure (psig) | 1.25 | — |
| Shell-side inlet flow rate (sccm) | 0 | — |
| Reactor tube diameter, inside (cm) | 0.7 | 0.6 |
| Reactor Length (cm) | 5.5 | 7.5 |
| Catalyst weight (g) | 1.23 | 1.23 |
| Membrane material | Pd on alumina ultrafilter | — |
| Membrane thickness (μm) | 11.4 | — |

Figure 9:
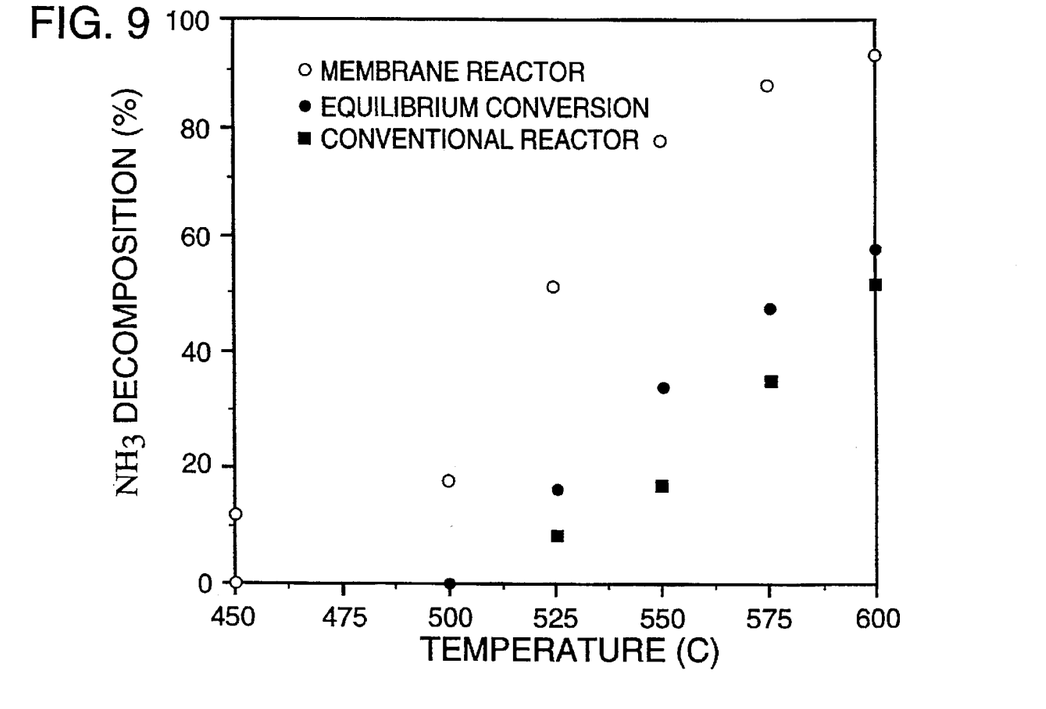
FIG. 9 is a graph of temperature versus percent-ammonia decomposition for a membrane reactor as compared to a conventional reactor.

The results of ammonia decomposition experiments are shown in FIG. 9. FIG. 9 is a graph showing the percent decomposition of ammonia versus temperature that was achieved with a membrane reactor according to the present invention versus a conventional reactor. The conventional reactor comprised a nonporous alumina tube having dimensions similar to the membrane reactor. The conventional reactor was packed with a supported nickel catalyst. Equilibrium conversion as referred to in FIG. 9 is the maximum ammonia conversion that can be achieved in a conventional reactor of infinite length. FIG. 9 clearly shows that the membrane reactor had significantly increased ammonia decomposition relative to the conventional reactor. The decomposition of ammonia using the membrane reactor was low below a temperature of about 500° C., but was significantly increased above a temperature of about 600° C. More specifically, at a temperature of about 600° C. the percent decomposition of ammonia was greater than about 94% using the membrane reactor. The results presented in FIG. 9 clearly demonstrate that a membrane reactor is more effective than a conventional reactor, and under conditions similar to that used in an IGCC can achieve almost complete removal of ammonia.

The present invention has been described with reference to preferred embodiments. Other embodiments of the invention will be apparent to those of skill in the art from the consideration of this specification or practice of the invention disclosed herein. It is intended that the specification and examples be considered as exemplary only, with the true scope and spirit of the invention being indicated by the following claims.

We claim:

1. A method for making a membrane for selectively removing hydrogen from a mixture of gases containing hydrogen, comprising chemically depositing a uniform layer of palladium metal on the inside surface of a tubular, porous ceramic support having a pore size of greater than about 10 nm.

2. The method according to claim 1 wherein the layer of palladium metal has a thickness of from about 10 μm to about 20 μm.

3. The method according to claim 1 wherein the step of chemically depositing comprises:

adsorbing a layer of colloidal tin ions on the inside surface of the porous ceramic support; and depositing a palladium metal layer on the colloidal tin.

4. A method for forming a membrane for selectively removing hydrogen from a mixture of gases containing hydrogen, comprising;

providing a porous, tubular ceramic support having inside and outside opposed surfaces, the ceramic support having a pore size of from about 10 nm to about 200 nm;

covering the outside surface;

applying a sensitizing material to the inside surface of the support, the sensitizing material comprising an aqueous solution of Sn (II) and Sn (IV) ions; and applying a palladium metal layer to the inside surface.

5. The method according to the method of claim 4 wherein the palladium metal layer has a thickness of from about 10 μm to about 20 μm.

* * * * *